(12) United States Patent
Schantz et al.

(10) Patent No.: US 7,360,727 B2
(45) Date of Patent: Apr. 22, 2008

(54) APPARATUS AND METHOD FOR THE MECHANICAL COMMINUTION OF SEMICONDUCTOR MATERIALS

(75) Inventors: Matthaeus Schantz, Reut (DE); Peter Gruebl, Triftern (DE); Hanns Wochner, Burghausen (DE)

(73) Assignee: Wacker Chemie AG, Munich (DE)

( * ) Notice: Subject to any disclaimer, the term of this patent is extended or adjusted under 35 U.S.C. 154(b) by 18 days.

(21) Appl. No.: 11/410,807

(22) Filed: Apr. 25, 2006

(65) Prior Publication Data

US 2006/0243834 A1 Nov. 2, 2006

(30) Foreign Application Priority Data

Apr. 28, 2005 (DE) ............ 10 2005 019 873

(51) Int. Cl.
*B02C 25/00* (2006.01)
(52) U.S. Cl. .............. 241/30; 241/283; 241/285.3
(58) Field of Classification Search ........... 241/30, 241/283, 263, 285.3
See application file for complete search history.

(56) References Cited

U.S. PATENT DOCUMENTS

| | | | |
|---|---|---|---|
| 3,524,486 A * | 8/1970 | Turner | 99/571 |
| 3,831,866 A * | 8/1974 | Phillips | 241/63 |
| 3,841,212 A * | 10/1974 | Powell | 99/571 |
| 4,135,442 A * | 1/1979 | Nafziger et al. | 99/582 |
| 4,313,573 A * | 2/1982 | Goldberger et al. | 241/1 |
| 6,024,306 A * | 2/2000 | Koppl et al. | 241/1 |
| 6,309,467 B1 | 10/2001 | Wochner et al. | |
| 6,360,755 B1 * | 3/2002 | Schantz et al. | 134/1.3 |

FOREIGN PATENT DOCUMENTS

| | | |
|---|---|---|
| DE | 38 11 091 A1 | 10/1989 |
| DE | 43 16 626 A1 | 11/1994 |
| EP | 1 391 252 A1 | 2/2004 |

OTHER PUBLICATIONS

Derwent Abstract corresponding to DE 43 16 626 A1.
Derwent Abstract corresponding to DE 38 11 091 A1.

* cited by examiner

*Primary Examiner*—Faye Francis
(74) *Attorney, Agent, or Firm*—Brooks Kushman P.C.

(57) ABSTRACT

A mechanical crushing apparatus for comminuting a polycrystalline silicon ingot, has a base and opposed comminuting and mating chisels, the chisels having longitudinal axises oriented at right angles to a longitudinal axis of the base and parallel to the surface of the base, and being movable in such a manner that a silicon ingot to be comminuted and which rests on the surface of the base can be positioned between the chisels such that all the chisels in the region of the silicon ingot are in contact with the silicon ingot, and comminution chisels in front of and behind the silicon ingot can be moved in the direction of their longitudinal axis to within a safety distance of the respective mating chisel, and the comminution chisels act on and break up the silicon ingot by means of sudden movement(s) in the direction of their longitudinal axes.

4 Claims, 6 Drawing Sheets

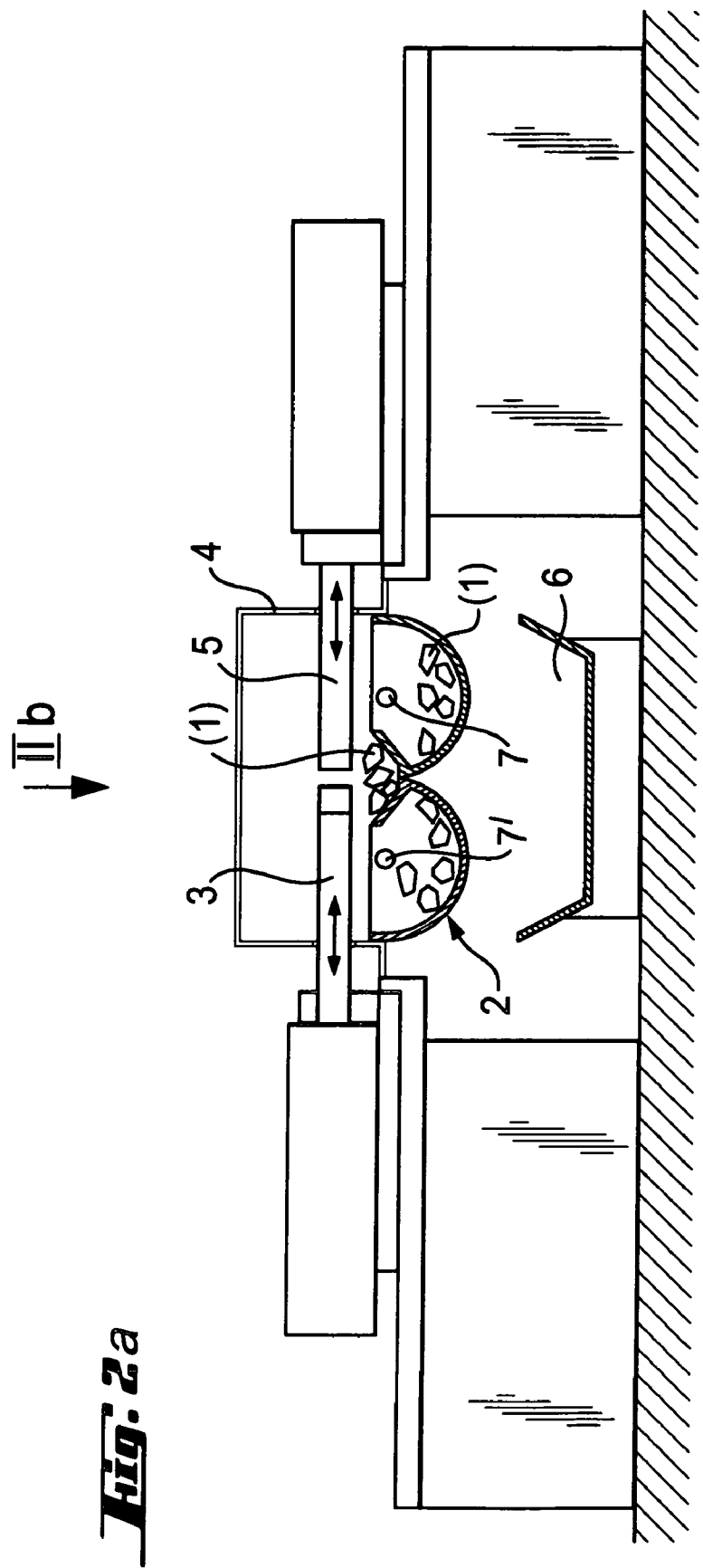

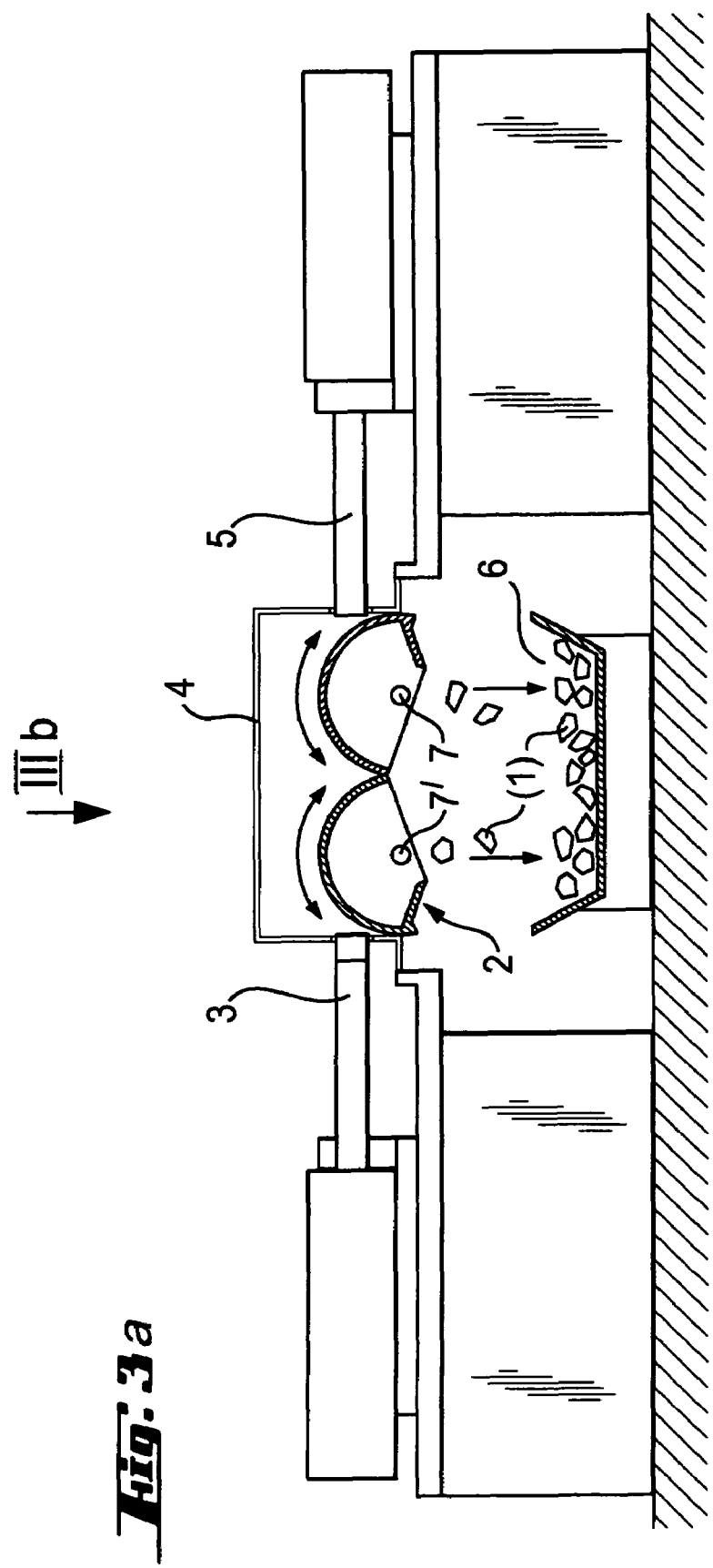

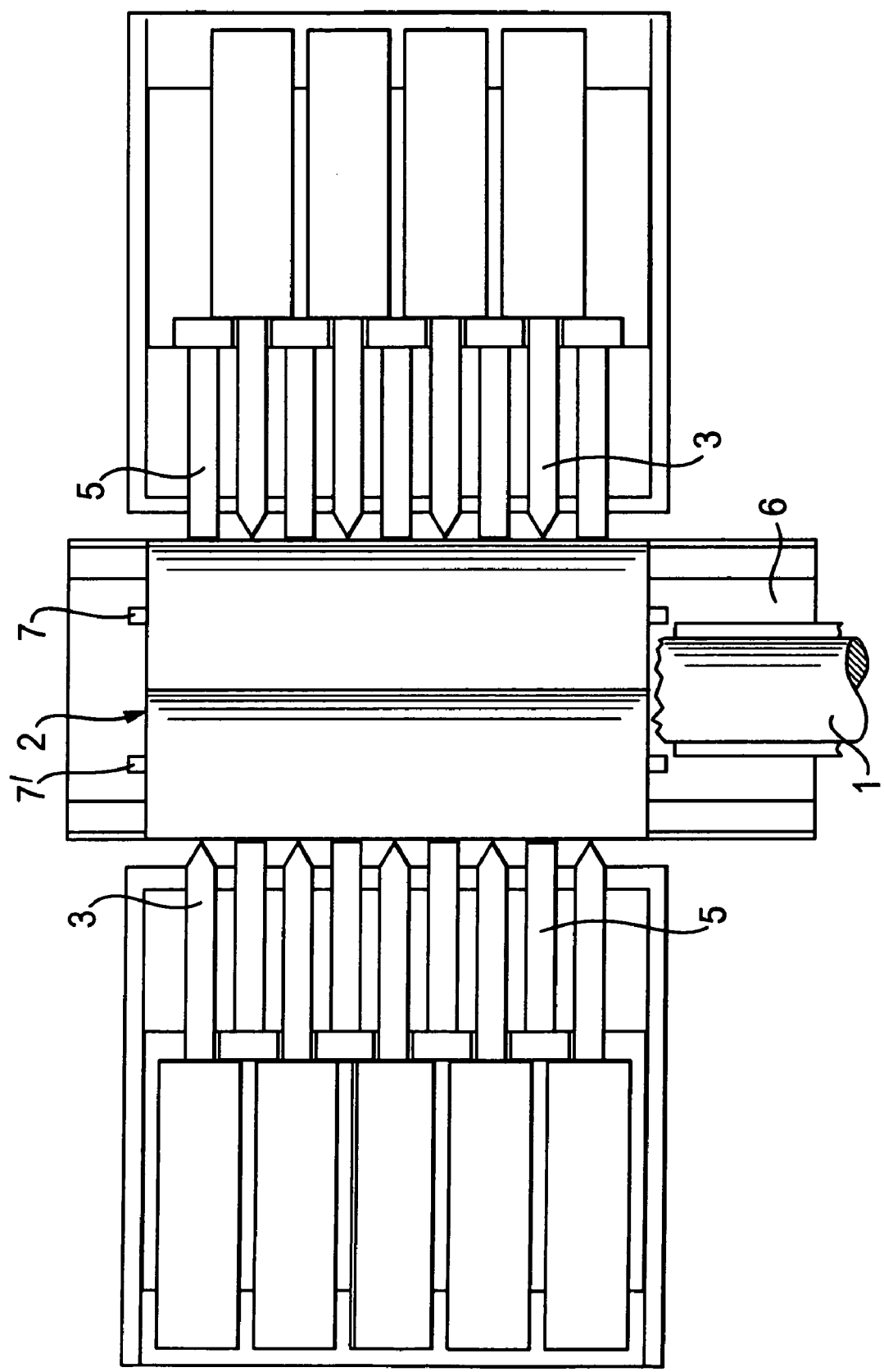

APPARATUS AND METHOD FOR THE MECHANICAL COMMINUTION OF SEMICONDUCTOR MATERIALS

BACKGROUND OF THE INVENTION

1. Field of the Invention

The invention relates to an apparatus and a method for the mechanical comminution of semiconductor materials into predetermined size classes.

2. Background Art

Pure silicon is obtained by thermal cracking of silicon compounds, such as for example trichlorosilane, and often takes the form of polycrystalline ingots. To produce single crystals using the Czochralski process, the crystal ingots first of all have to be comminuted into fragments. The fragments are placed in a crucible, with an optimum crucible filling level of molten silicon achieved by use of a combination of different fragment sizes. Then, a seed crystal is used to pull a single crystal from the melt. For the production of polycrystalline solar cells, it is also necessary for the crystal ingots to be comminuted into fragments. These fragments are then cast to form blocks, cut into panels, and processed to form solar cells.

A number of methods for the comminution of silicon ingots have already been proposed. DE 4316626 A1 relates to a comminution method in which a high-pressure water jet is blasted onto a crystal ingot. U.S. Pat. No. 6,360,755 B1 describes a method in which a crystal ingot is comminuted with the aid of shockwaves generated by electrical energy. In DE 3811091 A1, it is proposed that a crystal ingot initially be decompacted by the action of heat and then be comminuted by the action of mechanical force. These comminution methods have the drawback that the size and weight distributions of the majority of the fragments cannot be set in a targeted manner.

A further drawback of conventional comminution machines, such as for example jaw crushers, is the formation of shell-like fragments with a relatively large surface area, and the resulting increase in impurity levels. To avoid these drawbacks, the majority of the polycrystalline silicon ingots are comminuted using manual tools, such as for example hammers. Although this manual method is able to produce the best shape of fragments with very low levels of contamination combined with a good yield, it is physically very hard work.

SUMMARY OF THE INVENTION

It is an object of the invention to provide a mechanical crushing apparatus for comminuting a polycrystalline silicon ingot which has the advantages of manual comminution. These and other objects are achieved through the use of a comminution apparatus which is capable of comminuting an ingot in its entirety in one stroke, by means of the use of opposed comminuting chisels.

BRIEF DESCRIPTION OF THE DRAWINGS

FIGS. 2a, 2b shows a front view and a plan view of an apparatus according to the invention after the comminution of the polycrystalline silicon ingot. The Si fragments are located in the base composed of two half-shells.

FIGS. 3a, 3b shows a front view and a plan view of an apparatus according to the invention, in which the Si fragments are emptied out of the base composed of two half-shells, into a discharge channel. The chisels have been moved into the starting position.

DETAILED DESCRIPTION OF THE PREFERRED EMBODIMENT(S)

Figure 1A:
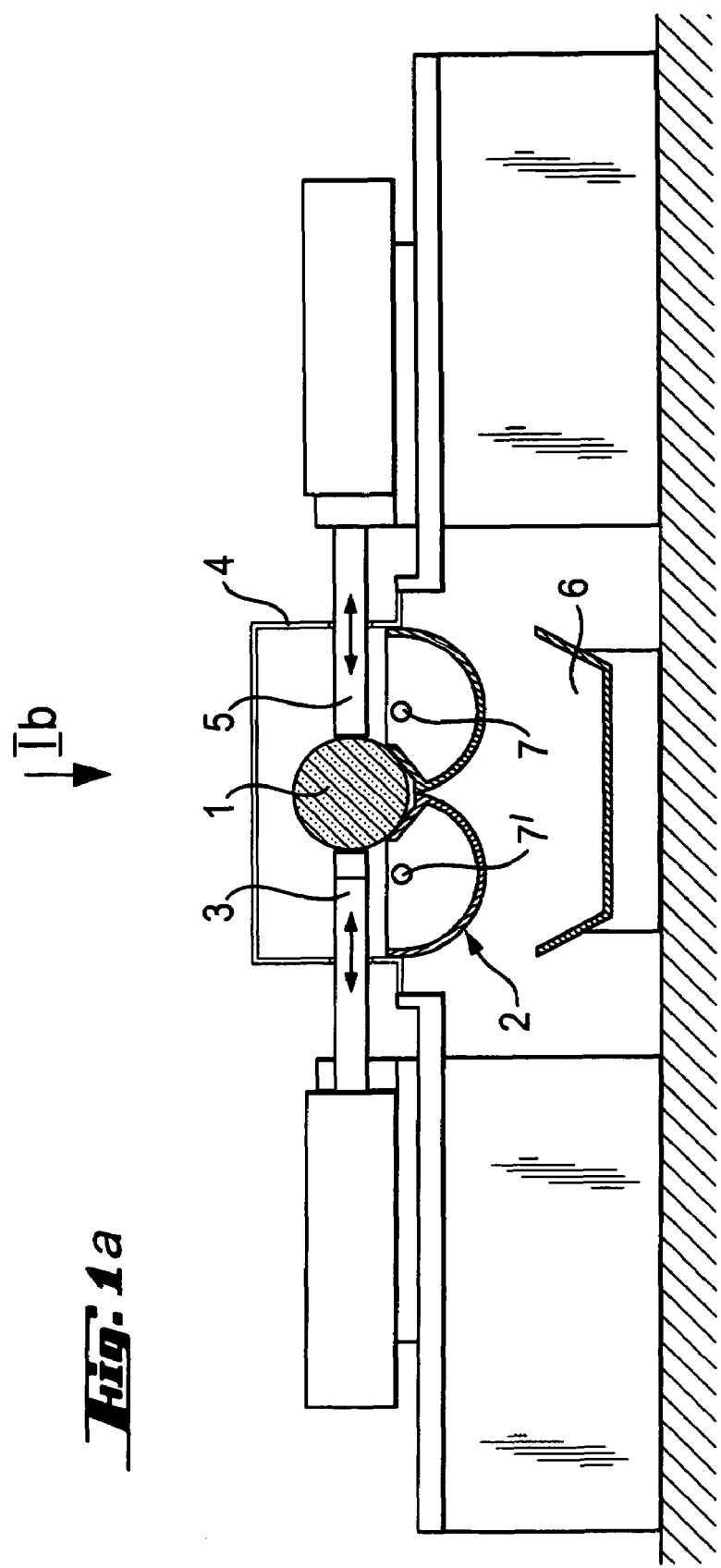
FIGS. 1a, 1b shows a front view and a plan view of an apparatus according to the invention, with a polycrystalline silicon ingot placed on the supporting prism formed by the base, prior to the commencement of comminution.

The apparatus preferably comprises a base (2), comminution chisels (3) and mating chisels (5), comminution chisels (3) and mating chisels (5) having a longitudinal axis oriented at right angles to the longitudinal axis of the base (2) and parallel to the surface of the base (2), comminution chisels (3) and mating chisels (5) being movable in such a manner that a silicon ingot (1) that is to be comminuted and is resting on the surface of the base (2) can be adjusted between the chisels (3, 5) in such a manner that all the chisels (3, 5) in the region of the silicon ingot (1) are in contact with the silicon ingot (1), and the comminution chisels (3) in front of and behind the silicon ingot (1) can be moved in the direction of their longitudinal axis to within a safety distance of the mating chisel (5), and the comminution chisels act on and break up the silicon ingot (1) by means of a sudden movement in the direction of their longitudinal axes. In one embodiment of the invention, the mating chisels can also act on and break up the silicon ingot (1) by means of a sudden movement in the direction of their longitudinal axes.

In the apparatus according to the invention, the arrangement of the crushing tools (comminution chisels and mating chisels) results in the entire crystal ingot being comminuted all at once, thereby preventing the formation of shell-shaped fragments. Moreover, the arrangement of the chisels parallel to the surface of the base means that during the breaking-up operation there are essentially no forces acting on the base.

There are no particular demands imposed on the shape of the chisels, but they are preferably flat chisels. The distance between adjacent chisels can preferably be varied. This distance is preferably from 20 mm to 500 mm, more preferably 60 to 250 mm. By varying the distance between the crushing tools, it is possible to produce any size of fragment. The sudden movement of the comminution chisels in the direction of their longitudinal axes is preferably effected by a pneumatic, hydraulic or electrical drive. A pneumatic drive is particularly preferred.

The base (2) is preferably a base composed of two half-shells, with each half-shell being rotatable about a rotation point (7, 7'). The base can be opened as a result of the two half-shells being rotated about the rotation points (7, 7'). As a result, the fragments of the comminuted silicon ingot (1) can be removed from the base following comminution and, for example, emptied onto a discharge channel (6).

When closed, the base (2) preferably forms a supporting prism for centering the silicon ingot. The height of the base (2) in the apparatus can be varied by rotating the half-shells. This makes it easy to adapt the apparatus to any desired diameters of the silicon ingots that are to be comminuted.

Preferably, the apparatus according to the invention comprises a cover (4) for the region in which the comminution of the semiconductor material takes place.

It is preferable for the surface of the parts of the apparatus according to the invention, in particular the surface of the parts which come into contact with polycrystalline silicon, particularly preferably the surface of the base (2), of the chisels (3) and of the mating chisels (5), to consist of steel.

The material abraded therefrom can easily be removed from the fragments of the comminuted silicon ingot by means of a pickling or etching process. A suitable process is described, for example, in U.S. Pat. No. 6,309,467 A.

It is also possible to use a hard metal or sintered carbide, such as tungsten carbide. An apparatus of this type is suitable in particular for the direct production (i.e. without subsequent cleaning) of poly fragments with a low level of contamination, as used for example in the solar industry.

A further advantage of the apparatus according to the invention resides in the fact that the crushing zone is set automatically according to the length of the crystal ingot, which prevents pieces of ingot from moving out of the way during the comminution.

A further object of the invention is to provide a mechanical crushing method which maintains all the advantages of the manual method. This object is achieved by a method for the mechanical comminution of a polycrystalline silicon ingot (1), in which the polycrystalline silicon ingot (1) is located on a height-adjustable base (2), where it is adjusted between comminution chisels (3) and mating chisels (5) in such a manner that all the chisels (3, 5) in the region of the silicon ingot (1) are in contact with the silicon ingot (1), and comminution chisels (3) and mating chisels (5), in front of or behind the silicon ingot (1), are moved toward one another to within a safety distance, and then a recurring striking movement is started for all the comminution chisels (3) bearing against the silicon ingot (1), effecting comminution of the silicon ingot (1).

The principle of tools having a purely striking action means that the fragments are less susceptible to contamination from abraded metallic material, since there is no milling operation involved, as is used for example in the case of jaw crushers, cone crushers and other comminution machines. The whole of the silicon ingot is crushed.

It is preferable for the silicon ingot to be comminuted to such an extent that once a depth of penetration, which can be set by a limit switch, of the comminution chisels (3) into the silicon ingot (1) has been reached, the striking momentum imparted to the comminution chisels (3) is switched off. After the comminution, the chisels (3, 5) are retracted and the fragments of the comminuted polycrystalline silicon ingot (1) are moved onto a discharge channel (6) by opening the base (2).

Next, metal contamination of the Si fragments is preferably removed by a pickling or etching process. The pickling or etching process may advantageously take place immediately after the comminution, i.e. without a prior heat treatment of the silicon ingot. A prior heat treatment of the ingot, as described for example in EP 1 391 252 A1, is not necessary in the method according to the invention. Therefore, the method according to the invention avoids the risk of the metals diffusing into the silicon ingot and no longer being detectable by methods for detecting the metal content on the surface. Therefore, it is preferable for the fragments from the discharge channel 6 to be transferred into a pickling or etching process immediately afterwards in order for the metal contamination to be cleaned off.

It is preferable for the chisels 3 and the mating chisels 5 to be returned to their starting positions following comminution of each ingot or portion thereof. Moving the comminution chisels 3 and mating chisels 5 in front of or behind the silicon ingot 1 toward one another to within a safety distance delimits the length of the silicon ingot and prevents fragments of the silicon ingot (1) from being thrown out of the area of action of the chisels (3, 5) during comminution.

The method according to the invention can produce Si fragments for the Czochralski process (CZ pulling) and for the production of solar cells within a very short time and in a very economical way. It is possible, by means of the inventive method, to produce cubic silicon fragments of any desired size. With cubic silicon fragments, unlike the shell-shaped fragments, the crucible filling levels which are desired during CZ pulling are easily achieved. The invention therefore also relates to a bulk material made up of cubic silicon fragments, wherein the quotient of mean weight and mean length of the cubic silicon fragments is greater than $\sqrt{2}$.

Figure 1B:
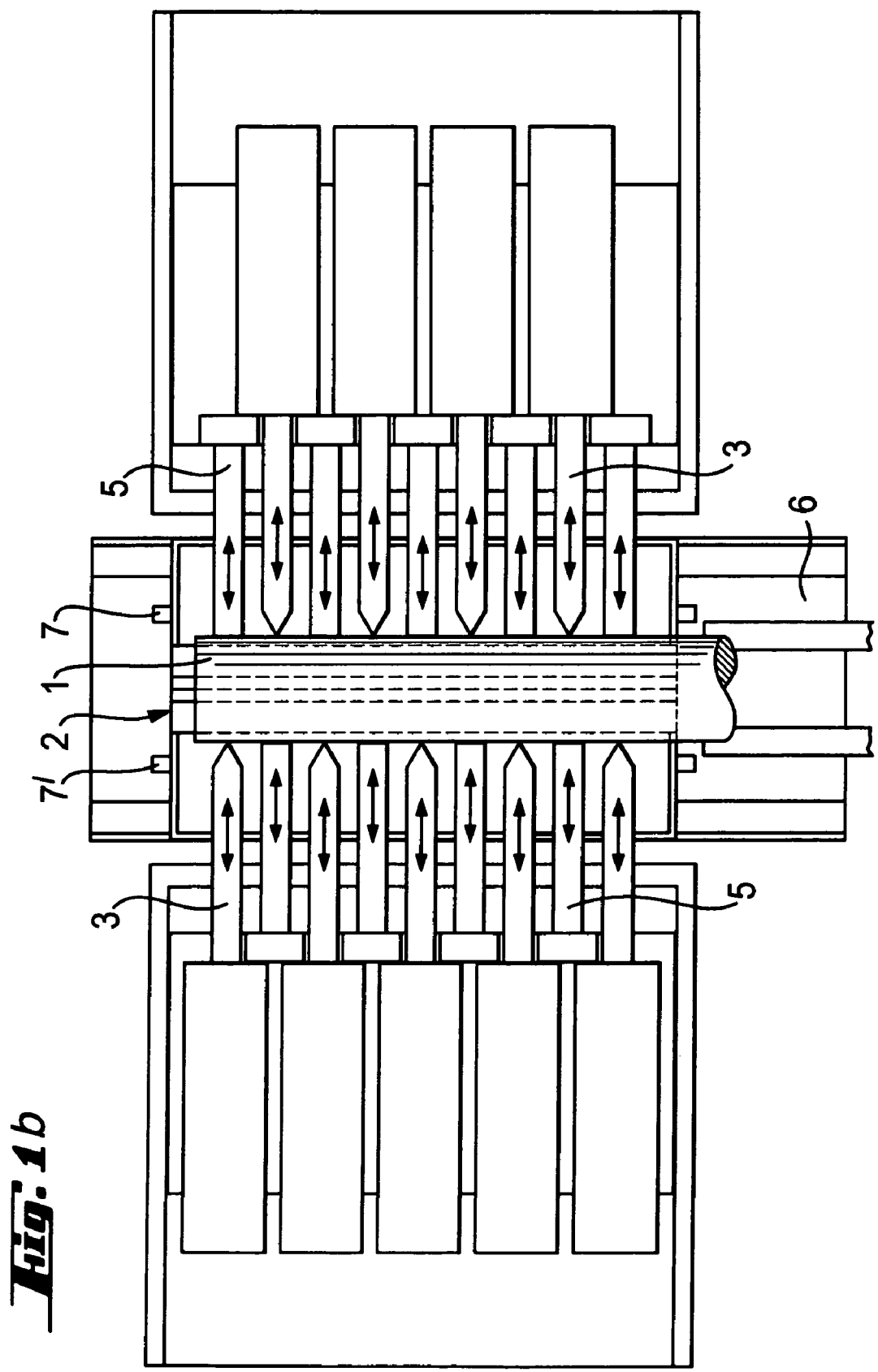
Figure 2B:
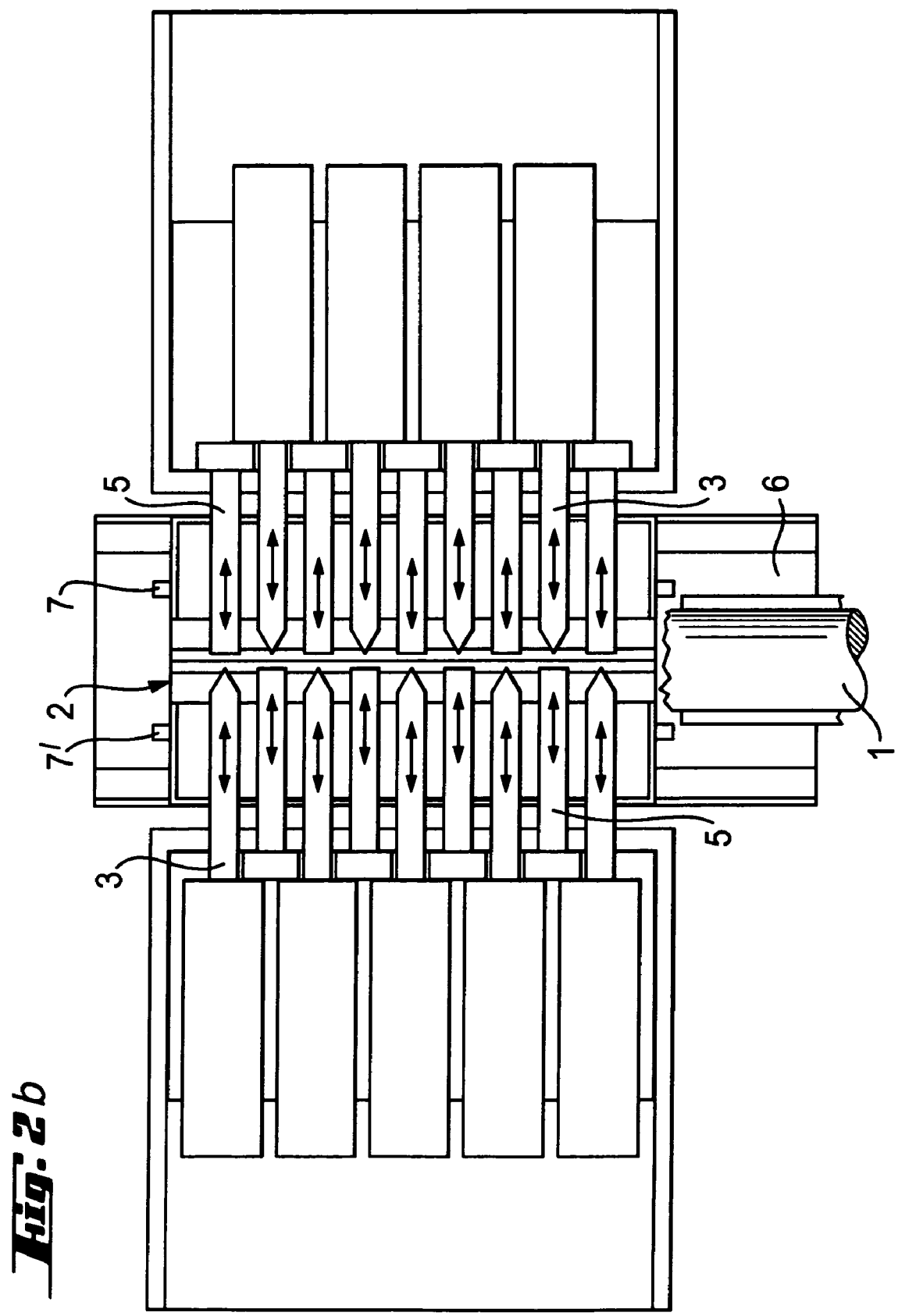

The following example serves to provide a further explanation of the invention:

In an apparatus similar to that shown in FIG. 1a, 1b, an Si ingot that is to be comminuted is placed on the supporting prism of the base. The longitudinal sides of two trough shells arranged parallel to one another form the supporting prism. The trough shells are installed rotatably on the crusher carriage.

A linear guide installed parallel to the crusher carriage assists with fixing of the Si ingot during loading. Then, the crusher carriage together with the Si ingot is moved into the crushing space, the region between the chisels. The crushing sequence is controlled by recording the displacement of the carriage and can be selected variably. After the crushing carriage has reached its position, first of all the three mating chisels are moved onto the ingot in order to fix it in place. Later, the comminution chisels are moved onto the ingot and the crushing cycle is started. The crushing operation is only interrupted when the first piece of the ingot has been crushed and the comminution chisels have reached a defined limit position. Then, comminution chisels and mating chisels are simultaneously moved back to their starting positions and the crusher carriage is moved cyclically into the next crushing position. The crushing operation begins again. This operation is repeated until the entire ingot has been crushed. The length of the Si ingots may differ. After the crushing operation, the crushing carriage is moved into a defined limit position, the rotatably mounted trough shells are rotated through approx. 150' with respect to one another and the Si fragments are emptied onto a conveyor channel, installed beneath the crusher carriage, in order to be transported further.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for a mechanical communution of a polycrystalline silicon ingot comprising the steps of: providing a mechanical crushing apparatus comprising a height-adjustable base having a longitudinal axis and a top surface, generally opposed comminution chisel and mating chisel pairs, said comminution chisels and said mating chisels having longitudinal axes oriented at right angles to the longitudinal axis of said height-adjustable base and parallel to the surface of said height-adjustable base, locating a polycrystalline silicon ingot on said height-adjustable base, positioning the ingot between said comminution chisels and said mating chisels such that chisels in the region of the silicon ingot are in contact with the silicon ingot and said comminution chisels and said mating chisels, in front of or behind the silicon ingot, are moved toward one another in the direction of their longitudinal axis to within a safety distance, and then a recurring striking movement is started for all the comminution chisels bearing against the silicon ingot, effecting comminution of the silicon ingot into Si fragments.

2. The method of claim 1, wherein once a defined depth of penetration of the comminution chisels into the silicon ingot has been reached, the striking momentum imparted to the comminution chisels is switched off.

3. The method of claim 1, wherein after the comminution of the silicon ingot, the chisels are retracted and the fragments of the comminuted polycrystalline silicon ingot are moved onto a discharge channel.

4. The method of claim 1, wherein the comminution is followed by a pickling or etching process to remove metal contamination from the crushing apparatus from the Si fragments.

* * * * *

UNITED STATES PATENT AND TRADEMARK OFFICE
CERTIFICATE OF CORRECTION

| | | |
|---|---|---|
| PATENT NO. | : 7,360,727 B2 | Page 1 of 1 |
| APPLICATION NO. | : 11/410807 | |
| DATED | : April 22, 2008 | |
| INVENTOR(S) | : Matthaeus Schantz et al. | |

It is certified that error appears in the above-identified patent and that said Letters Patent is hereby corrected as shown below:

Column 4, Line 55, Claim 1:

Delete "communution" and insert -- comminution --.

Signed and Sealed this

Twenty-ninth Day of July, 2008

JON W. DUDAS
*Director of the United States Patent and Trademark Office*